(12) United States Patent
Tease et al.

(10) Patent No.: US 8,388,301 B2
(45) Date of Patent: Mar. 5, 2013

(54) TURBINE SYSTEM FOR UTILIZING THE ENERGY OF OCEANIC WAVES

(75) Inventors: William K. Tease, Inverness (GB); Janet Lees, Inverness (GB)

(73) Assignee: Voith Patent GmbH, Heidenheim (DE)

( * ) Notice: Subject to any disclaimer, the term of this patent is extended or adjusted under 35 U.S.C. 154(b) by 64 days.

(21) Appl. No.: 12/478,370

(22) Filed: Jun. 4, 2009

(65) Prior Publication Data
US 2009/0317230 A1    Dec. 24, 2009

Related U.S. Application Data

(63) Continuation of application No. PCT/EP2007/010338, filed on Nov. 29, 2007.

(30) Foreign Application Priority Data

Dec. 4, 2006 (DE) .......................... 10 2006 057 383

(51) Int. Cl.
*F03B 13/12* (2006.01)
(52) U.S. Cl. .......... 415/3.1; 415/117; 415/906; 134/198
(58) Field of Classification Search ............... 415/1, 3.1, 415/2.1, 4.3, 4.5, 13, 116, 117, 906, 908; 134/116, 198
See application file for complete search history.

(56) References Cited

U.S. PATENT DOCUMENTS

| | | | | |
|---|---|---|---|---|
| 4,196,020 A | * | 4/1980 | Hornak et al. | 134/167 R |
| 4,808,235 A | * | 2/1989 | Woodson et al. | 134/22.19 |
| 5,011,540 A | * | 4/1991 | McDermott | 134/23 |
| 5,191,225 A | * | 3/1993 | Wells | 290/53 |
| 5,193,976 A | * | 3/1993 | Kolev et al. | 415/116 |
| 5,273,395 A | * | 12/1993 | McDermott | 415/121.3 |
| 5,868,860 A | * | 2/1999 | Asplund | 134/22.1 |
| 5,919,689 A | | 7/1999 | Selvig et al. | |
| 5,944,483 A | * | 8/1999 | Beck et al. | 415/117 |
| 6,073,637 A | * | 6/2000 | Hayward et al. | 134/22.1 |
| 6,394,108 B1 | * | 5/2002 | Butler | 134/22.18 |
| 6,398,518 B1 | * | 6/2002 | Ingistov | 417/244 |
| 6,491,048 B1 | * | 12/2002 | Foster | 134/169 A |
| 6,503,334 B2 | * | 1/2003 | Ruiz et al. | 134/18 |
| 6,553,768 B1 | * | 4/2003 | Trewin et al. | 60/772 |
| 6,630,198 B2 | * | 10/2003 | Ackerman et al. | 427/239 |

(Continued)

FOREIGN PATENT DOCUMENTS

| | | |
|---|---|---|
| DE | 474 482 | 3/1929 |
| DE | 607 906 | 1/1935 |

(Continued)

OTHER PUBLICATIONS

Documents regarding PCT/EP2007/010338, dated May 20, 2008 and Mar. 30, 2009.

(Continued)

*Primary Examiner* — Dwayne J White
*Assistant Examiner* — Aaron R Eastman
(74) *Attorney, Agent, or Firm* — Taylor IP, P.C.

(57) ABSTRACT

A turbine system for the utilization of the energy of oceanic waves includes: a chamber that is provided with an opening at its lower end and at its upper end respectively; a duct that is open at both ends for guiding a stream of air, the lower end of the chamber being designated to be submerged in ocean water, and the opening of the upper end being connected with one of the ends of the duct; an energy unit that is mounted coaxial to such and surrounded by the duct; and a device for cleaning the rotor blades of deposits or for preventing the formation of deposits on the rotor blades.

6 Claims, 4 Drawing Sheets

U.S. PATENT DOCUMENTS

| | | | |
|---|---|---|---|
| 6,659,715 B2 * | 12/2003 | Kuesters et al. | 415/116 |
| 6,932,093 B2 * | 8/2005 | Ogden et al. | 134/22.1 |
| 7,041,285 B2 | 5/2006 | Polsenski et al. | |
| 7,428,906 B2 * | 9/2008 | Asplund et al. | 134/22.1 |
| 7,445,677 B1 * | 11/2008 | Asplund | 134/24 |
| 7,497,220 B2 * | 3/2009 | Asplund et al. | 134/22.1 |
| 7,521,083 B2 | 4/2009 | Teichert | |
| 7,524,166 B2 * | 4/2009 | Thiele et al. | 415/173.1 |
| 7,670,440 B2 * | 3/2010 | Asplund et al. | 134/169 A |
| 2004/0009159 A1 | 1/2004 | Polsenski et al. | |
| 2004/0055626 A1 * | 3/2004 | Hata | 134/57 R |
| 2006/0048796 A1 * | 3/2006 | Asplund et al. | 134/21 |
| 2006/0243308 A1 * | 11/2006 | Asplund et al. | 134/22.12 |
| 2008/0078422 A1 * | 4/2008 | Wagner | 134/22.1 |
| 2008/0087301 A1 * | 4/2008 | Lee et al. | 134/18 |

FOREIGN PATENT DOCUMENTS

| | | |
|---|---|---|
| DE | 101 34 362 A1 | 1/2003 |
| DE | 103 32 876 A1 | 2/2005 |
| DE | 699 22 415 T2 | 11/2005 |
| DE | 10 2005 002 886 B3 | 5/2006 |
| DE | 10 2004 060 449 A1 | 6/2006 |
| DE | 10 2006 057 383 A1 | 6/2008 |
| DE | 103 32 876 B4 | 6/2008 |
| EP | 0 000 441 A1 | 7/1978 |
| GB | 1 595 700 | 8/1981 |
| GB | 2 207 210 A | 1/1989 |
| GB | 2 250 321 A | 3/1992 |
| JP | 2002115646 A | 4/2002 |
| WO | 03/048569 A2 | 6/2003 |
| WO | 2005/077554 A1 | 8/2005 |
| WO | 2006066591 A1 | 6/2006 |

OTHER PUBLICATIONS

Office Action dated Nov. 8, 2010 from The State Intellectual Property Office of the People's Republic of China in Application No. 200780050805.5 (2 pages).

International Search Report dated May 20, 2008 for PCT/EP2007/010338 (8 pages).

English translation of International Preliminary Report on Patentability (undated) for PCT/EP2007/010338 (8 pages).

Written Opinion of International Searching Authority (undated) for PCT/EP2007/010338 (7 pages).

* cited by examiner

TURBINE SYSTEM FOR UTILIZING THE ENERGY OF OCEANIC WAVES

CROSS REFERENCE TO RELATED APPLICATIONS

This is a continuation of PCT application No. PCT/EP2007/010338, entitled "TURBINE PLANT FOR GENERATING POWER FROM SEA WAVES", filed Nov. 29, 2007, which is incorporated herein by reference.

BACKGROUND OF THE INVENTION

1. Field of the Invention

The invention concerns a turbine system for utilizing oceanic waves and for converting the energy contained in such into electrical energy.

2. Description of the Related Art

Such systems became known, for example, in EP 0 000 441 A1 and GB 2 250 321 A.

Systems of this type are designed as follows: They include a chamber that is open at its lower end and this open end is submerged into the ocean. At its upper end, the chamber also has an opening. Further, a duct is provided that serves to guide a stream of air. At its open end, the duct is connected to the upper opening of the chamber. Inside the duct, an energy unit is located that is enclosed by it and which is coaxially mounted to the duct with a turbine rotor, as well as perhaps with an electrical generator that is in drive connection with the rotor.

The level of ocean water within the chamber rises and falls continually as a result of the oceanic waves; the movement of these waves thus acts into the chamber. Inherent in each rise of the water level, a displacement of the amount of air that is in the chamber takes place. Air is displaced when the water level rises and flows through the upper opening of the chamber and thus also through the duct in which the turbine is mounted. The stream of air drives the turbine and thereby also the electrical generator that, as such, generates electrical energy.

When the water level falls, the same process takes place in the chamber—only the stream of air reverses itself. Mechanical possibilities exist for letting the turbine rotor run in one and the same rotational direction, regardless of the direction of the stream of air. Such a possibility is described, for example, in GB 1 595 700 B.

The wave energy that is contained in the oceans of the world in inexhaustible. The median annual wave energy at a depth of 10 m is at a range of magnitude of 10 kW/m, and at a depth of 40 m, at 50 kW/m. The problem lies, however, in an economic utilization of the abundantly present energy, so that the costs per Kilowatt hour are competitive. To convert such into economically usable energy at acceptable costs is, however, often not possible in many systems that convert renewable energies as they are provided by nature. The economics of a system of the type described thus often heavily depends on the degree of effectiveness. The possibilities of exerting an influence are limited.

What is needed in the art are systems of the type mentioned at the beginning which are improved such that their degree of effectiveness is increased.

SUMMARY OF THE INVENTION

The present invention provides a turbine system for utilizing the energy of oceanic waves which includes: a chamber that has at its lower end and at its upper end respectively an opening; a duct that is open at both ends for guiding a stream of air, the lower end of the chamber being designated to be submerged in the water of the ocean, and the opening of the upper end being connected to one of the ends of this duct; a coaxially mounted energy unit that is surrounded by the duct; and a spraying unit that is connected to a source of a liquid or gaseous or steam medium that dissolves salt, and which applies the medium to the rotor blades.

The present invention also provides a process for operating a turbine system for utilizing the energy of oceanic waves. The process includes the steps of: (a) providing the turbine system for utilizing the energy of oceanic waves, the turbine system including: a chamber that has at its lower end and at its upper end respectively an opening; a duct that is open at both ends for guiding a stream of air, the lower end of the chamber being designated to be submerged in the water of the ocean, and the opening of the upper end being connected to one of the ends of this duct; a coaxially mounted energy unit that is surrounded by the duct; and a spraying unit that is connected to a source of a liquid or gaseous or steam medium that dissolves salt, and which applies the medium to the rotor blades; and (b) operating the spraying unit intermittently.

The inventors have recognized the following: In turbine systems for converting oceanic energy into electrical energy, sediments of particles of all types collect on the surfaces of the rotor blades. The sediments precipitate from the stream of air that flows through the duct of the turbine. This is the case even then when the air does not contain any water in liquid form. The air is, however, loaded with humidity and also contains oceanic salt. From this, a precipitate forms that is at first so fine that it cannot be seen with the bare eye, for which reason it has not attracted notice up to now. This precipitate has a roughness that brakes the stream of air at the bounding surface to the rotor blades or leads to a displacement of the stream of air, and thus to a diminished degree of effectiveness of the turbine and thus the entire system. The mentioned roughness can also be caused by organic substances that grow on the rotor blades over the course of time.

Accordingly, the solution of the problem lies therein, that steps are taken in order to keep the surfaces of the rotor blades free from the precipitates mentioned and from sediments or, if such have already formed, to remove such.

The solution in accordance with the invention includes several alternatives. Perhaps the simplest step is offered by a spraying arrangement that sprays a stream of a liquid medium onto the rotor blades, for example, water. It is important that the medium is able to dissolve the salt that has settled on the surfaces of the rotor blades. Thereby, even ocean water comes into consideration. In each case, continuous or discontinuous treatment is conceivable.

Instead of a liquid, putting the rotor blades under pressure with a fine spray of fog or steam also comes into consideration.

In practice, significant successes have been achieved. Thus, the degree of effectiveness could be increased significantly as a result of washing the blades.

The invention can also be used for a direct utilization of the energy of oceanic waves. Here, for example, pumps come into consideration that can be components of water desalination systems. In any event, the invention can also be used in systems in which the mechanical energy is not transformed into electrical energy and which accordingly do not have a generator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
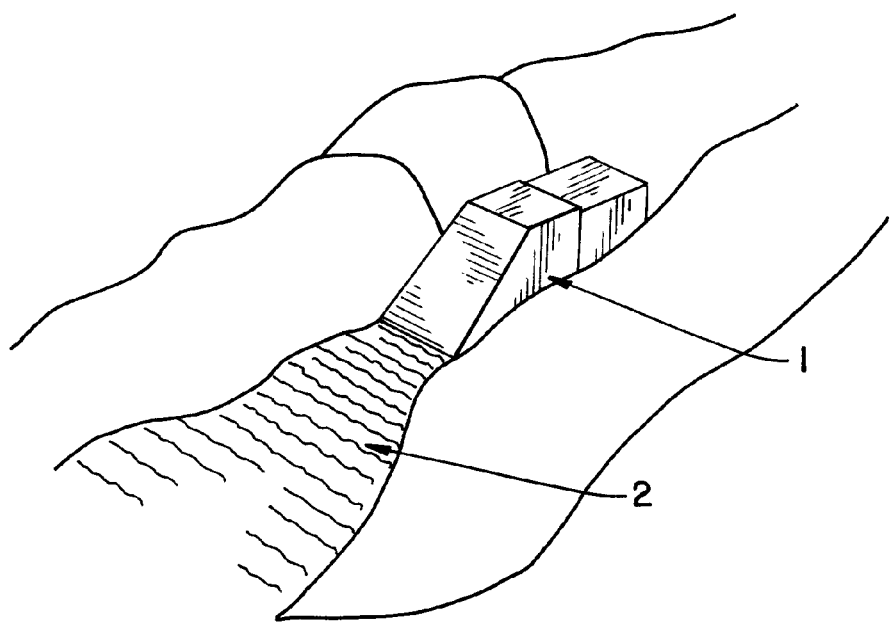
FIG. 1 shows a view of a wave energy power plant in a schematic perspective.

Referring now to the drawings, and more particularly to FIG. 1, there is shown a wave energy power plant which is in a coastal section, at best in a funnel-shaped bay, in which a high concentration of energy dominates. The bay is connected with the open sea. The water is in constant motion—see the waves 2. Of the power plant, only one chamber 1 can essentially be seen.

Figure 2:
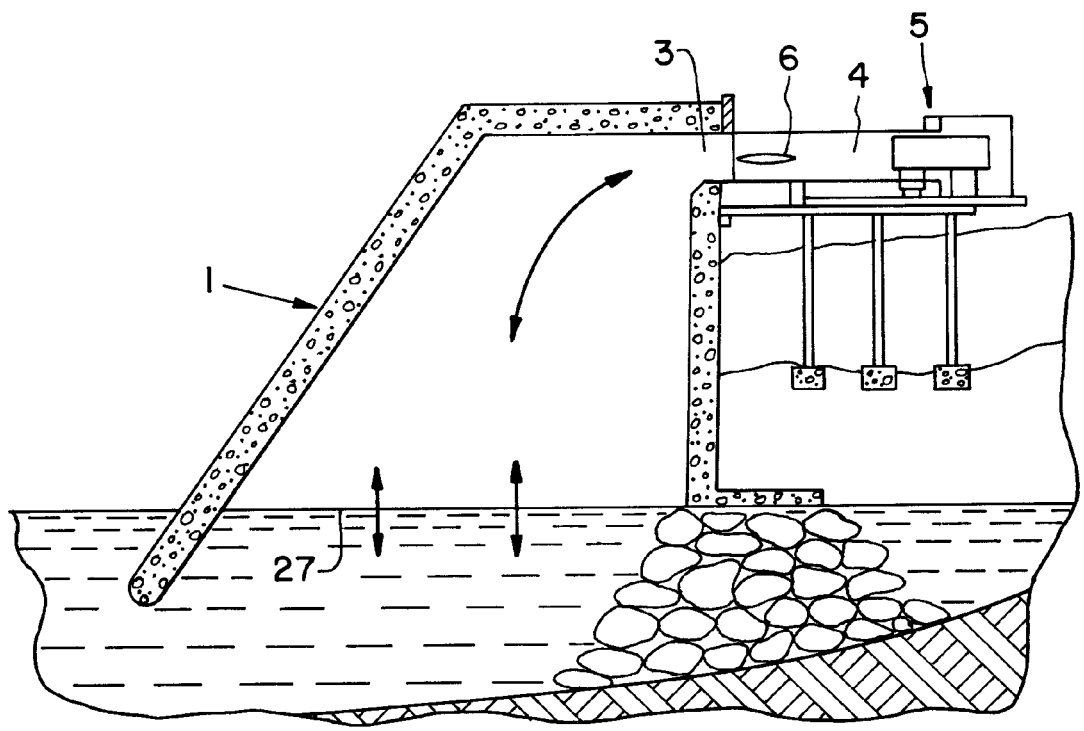
FIG. 2 shows the wave energy power plant according to FIG. 1 in a vertical cross section.

The chamber is open on the bottom, as can be seen in FIG. 2. The waves 2 reach to chamber 1. They are responsible that the water gauge (or water level) in the chamber rises and falls in vertical direction between a lower and an upper water gauge (or water level) (see the two vertical arrows).

Figure 3:
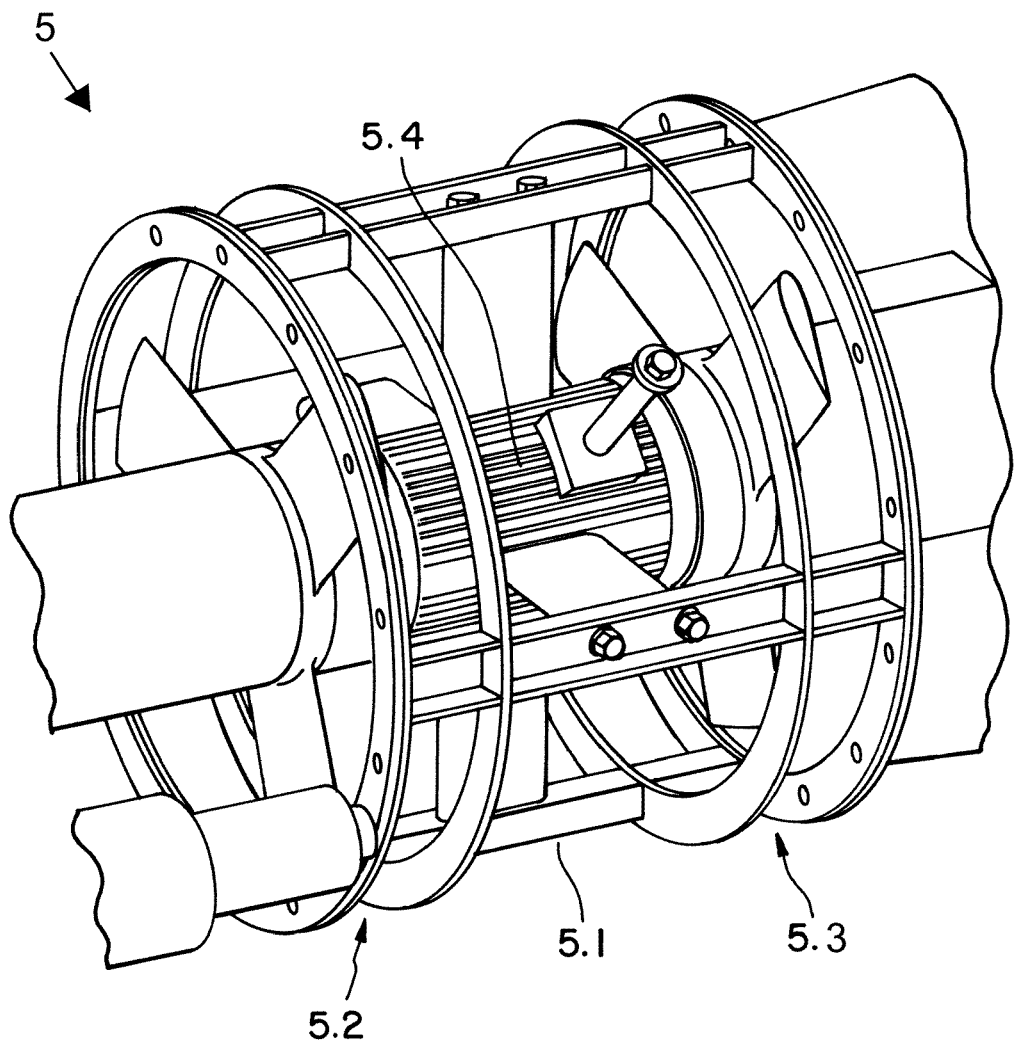
FIG. 3 shows a so-called Wells-turbine as an energy-generating unit, illustrated in a perspective view.

When the water level rises, the air that is enclosed in chamber 1 is displaced upward. It flows as shown by the crooked arrow. It exits chamber 1 through the upper opening 3. A channel 4 is connected to the upper opening 3. It contains energy generation unit 5. The energy generation unit 5 has a damper 6 preceding it. The design of energy generation unit 5 is rendered more precisely in FIGS. 3 to 6. FIG. 3 shows a ducted turbine 5. It has a duct 5.1, through which the air that is displaced from chamber 1 streams during operation.

The ducted turbine is a turbine whose rotor always rotates in the same direction of rotation, regardless of the direction of the stream of air. (See GB A 1 595 700).

As one can see from FIG. 3, the ducted turbine further includes two rotors 5.2, 5.3. These are mounted coaxially with respect to duct 5.1 and surrounded by it. The two rotors 5.2, 5.3 work toward a generator 5.4. Thereby, the two rotors, 5.2, 5.3 are designed in such a way and mounted that they always have one and the same direction of rotation regardless of side from which the stream of air enters into duct 5.1. This is necessary or advantageous because the air streams inland during a rise in the water level in chamber 1, and when it falls seaward.

The generator 5.4 delivers electrical energy to a grid that is not shown here.

Figure 5:
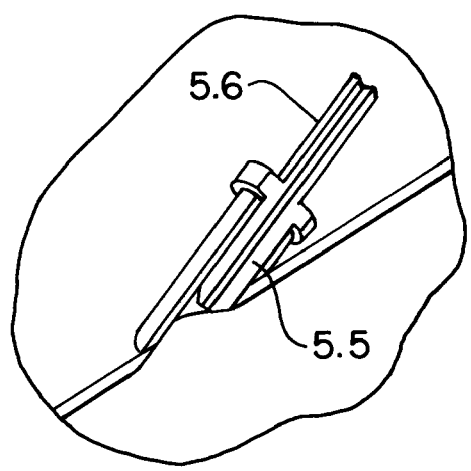
FIG. 5 shows a part of the subject matter of FIG. 4 in enlarged form.
Figure 4:
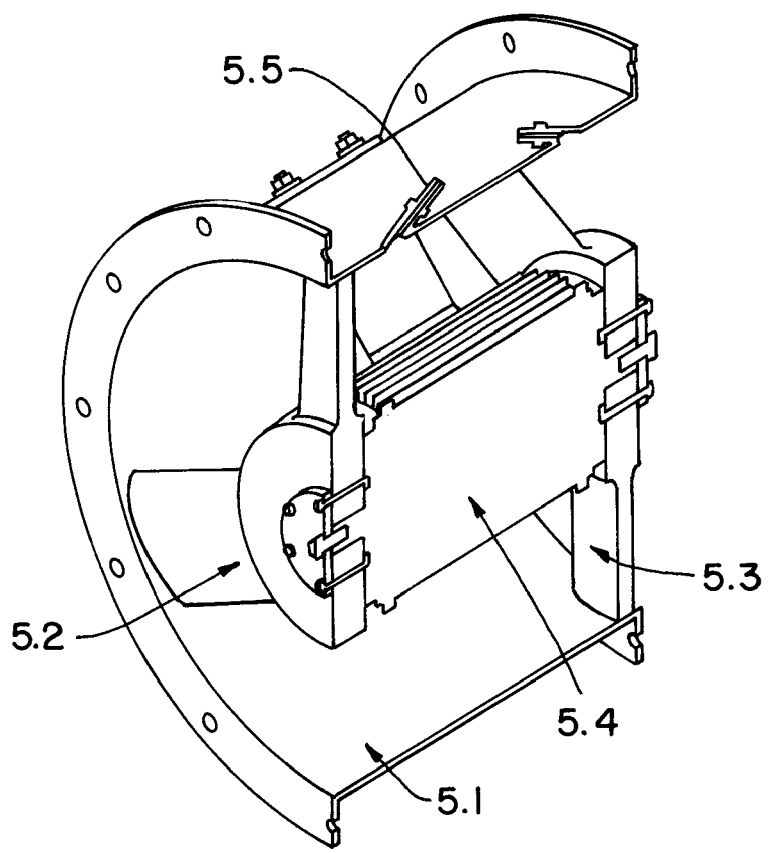
FIG. 4 shows a part of the subject matter of FIG. 3 in an enlarged representation.

In FIGS. 4 and 5 a spraying nozzle 5.5 can be recognized which is connected to a spraying water pipe 5.6. (See also FIG. 5). In general, several spraying nozzles are connected to spraying water pipe 5.6 that are aligned in such a way that the spraying or dribbling or dripping water hit the blades of the two rotors 5.2 and 5.3.

Figure 6:
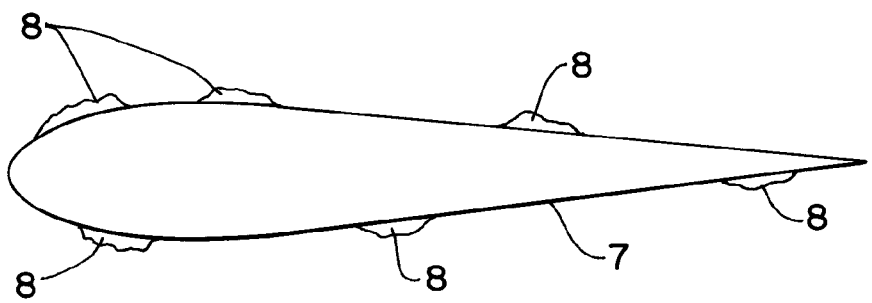
FIG. 6 shows a view of a blade of a turbine with sediments in the edge section of the blade in perspective view.

In FIG. 6 one can see the quantity of the crystallized salts in the area of the inlet or outlet edges of the turbine blades. The deposits reach a considerable quantity in the course of weeks or months when their build-up is not prevented by steps in accordance with the invention. (See the deposits 8 on rotor blade 7 that are shown in cross section).

Figure 7:
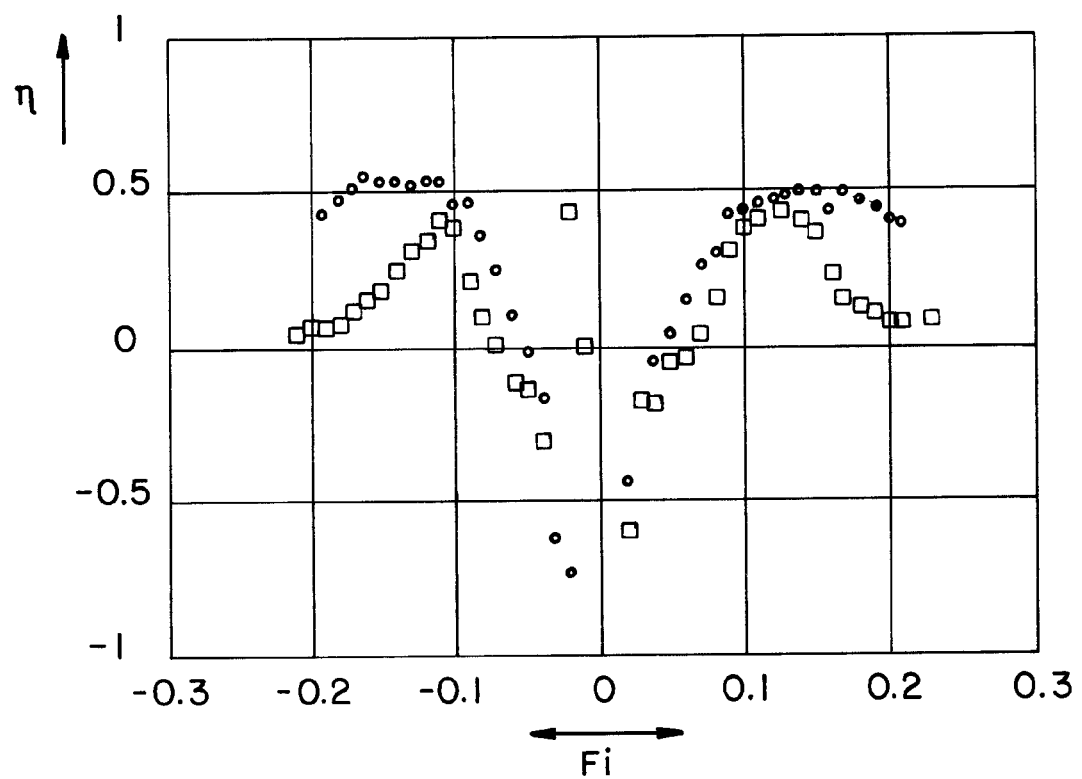
FIG. 7 is a diagram of the improvement of the degree of effectiveness (before/after) of the relationship between the axial current velocity and the tangential velocity.

The diagram shown in FIG. 7 shows the relationship Fi between the velocity of the axial air that is hitting the rotor blade and the tangential rotation velocity of the rotor. The ordinate reflects the degree of effectiveness 11 of the turbine. Thereby, the circles illustrate the degree of effectiveness 11 after applying a solution of a liquid to the turbine blades, and the quadrants show the progression of the degree of effectiveness without using the invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

This invention could be applied to any turbine, pumps, compressor, or fan where a coating builds up which is detrimental to its performance.

What is claimed is:

1. A turbine system for utilizing energy of a plurality of ocean waves, said turbine system comprising:

a chamber including a lower end with an opening and an upper end with an opening;

a channel including two ends, said channel being open at both said ends and configured for guiding a stream of air, said lower end of said chamber configured for being submerged in ocean water, said opening of said upper end being connected to one of said ends of said channel;

a coaxially mounted energy unit that is at least partially contained by said channel and includes a first plurality of rotor blades, a second plurality of rotor blades, and a duct surrounding said first plurality of rotor blades and said second plurality of rotor blades, said duct including a circumferential wall surrounding said first plurality of rotor blades and said second plurality of rotor blades, said circumferential wall defining an interior space in which said first plurality of rotor blades and said second plurality of rotor blades are positioned and defining a first through-hole and a second through-hole; and a spraying unit configured for being connected to a source of one of a liquid medium, a gaseous medium, and a steam medium that dissolves salt, said spraying unit including a first spray nozzle positioned adjacent said first through-hole and a second spray nozzle positioned adjacent said second through-hole, said first spray nozzle and said second spray nozzle being and configured for applying one of said liquid medium, said gaseous medium, and said steam medium as a spray medium of said spraying unit respectively to said first plurality of rotor blades and said second plurality of rotor blades respectively by way of said first through-hole and said second through-hole, said first spray nozzle and said second spray nozzle being directly attached to said duct, said first spray nozzle being positioned to apply said spray medium upstream in said duct onto said first plurality of rotor blades, said second spray nozzle being positioned downstream of said first spray nozzle to apply said spray medium downstream in said duct onto said second plurality of rotor blades, said spray medium being sea water.

2. The turbine system of claim 1, wherein said energy unit includes at least one turbine rotor and a generator, said at least one turbine rotor including at least respective ones of said first plurality of rotor blades, said generator being mounted coaxial to said at least one turbine rotor and being in drive connection therewith.

3. The turbine system of claim 2, wherein said energy unit includes a plurality of said turbine rotors including a first turbine rotor and a second turbine rotor, said first turbine rotor including said first plurality of rotor blades, said second turbine rotor including said second plurality of rotor blades.

4. The turbine system of claim 3, wherein each said first turbine rotor and said second turbine rotor, regardless of a direction of said stream of air, maintains a direction of rotation of each of said first turbine rotor and said second turbine rotor.

5. A process for operating a turbine system, said process comprising the steps of:
  providing a turbine system for utilizing energy of a plurality of ocean waves, said turbine system including:
    a chamber including a lower end with an opening and an upper end with an opening;
    a channel including two ends, said channel being open at both said ends and configured for guiding a stream of air, said lower end of said chamber configured for being submerged in ocean water, said opening of said upper end being connected to one of said ends of said channel;
    a coaxially mounted energy unit that is at least partially contained by said channel and includes a first plurality of rotor blades, a second plurality of rotor blades, and a duct surrounding said first plurality of rotor blades and said second plurality of rotor blades, said duct including a circumferential wall surrounding said first plurality of rotor blades and said second plurality of rotor blades, said circumferential wall defining an interior space in which said first plurality of rotor blades and said second plurality of rotor blades are positioned and defining a first through-hole and a second through-hole; and
    a spraying unit configured for being connected to a source of one of a liquid medium, a gaseous medium, and a steam medium that dissolves salt, said spraying unit including a first spray nozzle positioned adjacent said first through-hole and a second spray nozzle positioned adjacent said second through-hole, said first spray nozzle and said second spray nozzle being configured for applying one of said liquid medium, said gaseous medium, and said steam medium as a spray medium of said spraying unit respectively to said first plurality of rotor blades and said second plurality of rotor blades respectively by way of said first through-hole and said second through-hole, said first spray nozzle and said second spray nozzle being directly attached to said duct, said first spray nozzle being positioned to apply said spray medium upstream in said duct onto said first plurality of rotor blades, said second spray nozzle being positioned downstream of said first spray nozzle to apply said spray medium downstream in said duct onto said second plurality of rotor blades, said spray medium being sea water; and
  operating said spraying unit intermittently.

6. The process of claim 5, further including the steps of:
  capturing a condition of a surface of said first plurality of rotor blades with respect to roughness and a plurality of other characteristics of said surface;
  generating, by a sensor, a signal that is derived from capturing said condition; and
  actuating said spraying unit dependent on said signal.

* * * * *

UNITED STATES PATENT AND TRADEMARK OFFICE
CERTIFICATE OF CORRECTION

Page 1 of 1

PATENT NO.        : 8,388,301 B2
APPLICATION NO.   : 12/478370
DATED             : March 5, 2013
INVENTOR(S)       : William K. Tease et al.

It is certified that error appears in the above-identified patent and that said Letters Patent is hereby corrected as shown below:

In the Specification

COLUMN 4
At line 13, please delete "effectiveness 11", and substitute therefore --effectiveness η--;
At line 14, please delete "effectiveness 11", and substitute therefore --effectiveness η--; and
After line 29 and before "What is claimed is:", please insert the following:

--Legend

| | | |
|---|---|---|
| | 1 | Chamber |
| | 2 | Waves |
| | 3 | Chamber opening |
| | 4 | Channel |
| | 5 | Energy generation unit |
| | 5.1 | Duct |
| | 5.2 | Rotor |
| | 5.3 | Rotor |
| | 5.4 | Generator |
| | 5.5 | Spraying nozzle |
| | 5.6 | Spraying water pipe |
| | 6 | Damper |
| | 7 | Rotor blade |
| | 8 | Deposits--. |

In the Claims

COLUMN 5
At line 16, please delete "each said", and substitute therefore --each of said--.

Signed and Sealed this
Thirtieth Day of December, 2014

Michelle K. Lee
*Deputy Director of the United States Patent and Trademark Office*